April 11, 1939.   R. E. GORDONIER ET AL   2,153,830
THERMOMETER
Filed May 11, 1936

Inventor
Robert E. Gordonier
Howard L. Fischer
By Howard L. Fischer
Attorney

Patented Apr. 11, 1939

2,153,830

UNITED STATES PATENT OFFICE 2,153,830

THERMOMETER

Robert E. Gordonier and Howard L. Fischer, St. Paul, Minn., assignors to Brown & Bigelow, St. Paul, Minn., a corporation of Minnesota Application May 11, 1936, Serial No. 79,102

3 Claims. (Cl. 73—367)

This invention relates to an improvement in thermometers of a type particularly adapted to differentiate between certain ranges of temperature. It is common practice to call temperatures greater than 70 degrees for example, warm, for a home or office, and to designate temperatures lower than this amount, cool. While this particular value as a starting point for the two ranges of temperature may not be correct in many cases, it may be used as an example. On the usual types of thermometers the scale is continuous, and therefore more difficult to differentiate between temperatures above a certain degree and below a certain degree.

It is the object of our invention to provide a thermometer which is provided with a double-ended pointer and which is also provided with a dial having two separate scales thereon. The thermometer is so designated that when the temperature is below a certain degree, the pointer will designate this fact on one scale, and when the temperature is above a certain predetermined amount, it will register on the other scale.

It is an added feature of our invention to designate the different scales with suitable terminology so that each scale may be readily defined. For example, one scale may be designated by the term "Warm", and the other scale designated by the term "Cool". In this way, the observer will readily note that the temperature is below or above a certain predetermined amount, for the temperature at any one time with the exception of the time the pointer designates to the predetermined changing point, only registers on one of the scales.

It is a further feature of our invention to provide numerals of different colors on each of the scales to more clearly differentiate between warm and cool temperatures.

An outstanding feature of our thermometer resides in a balanced needle or indicating element which is adapted to indicate the temperature. By using a balanced needle the thermostatic element is more sensitive and is designed to operate more readily to indicate the temperature upon the face of the thermometer. In a thermometer of this character, a metallic thermostatic element may be employed and a form of this element may be in a coil with one end of the coil adjustably fixed while the other end of the coil supports the shaft which supports the balanced needle or indicating element. Thus we provide a thermometer or temperature indicator wherein the indicating element is virtually perfectly balanced owing to its form and character, and we thereby provide a temperature indicator sensitive to changes in temperature so as to more readily and quickly indicate the various changes in the temperature.

In one form of our thermometer both ends of the temperature indicating element or needle are exposed. In another form, only one end of the balanced indicating element or needle is exposed in the operation of the thermometer excepting at one point or temperature. This point may be the exact horizontal position of the balanced temperature indicating needle or may be placed at a different position than we have indicated it.

The shield which covers half the dial is preferably elevated from the other half of the dial and on which the indicia is placed to indicate the degrees of temperature. This provides a novel form of thermometer wherein the indicating needle is balanced yet where only one end of the needle is exposed at a time.

These and other objects and novel features of our invention will be more fully and clearly set forth in the accompanying specification and claims.

Figure 1:
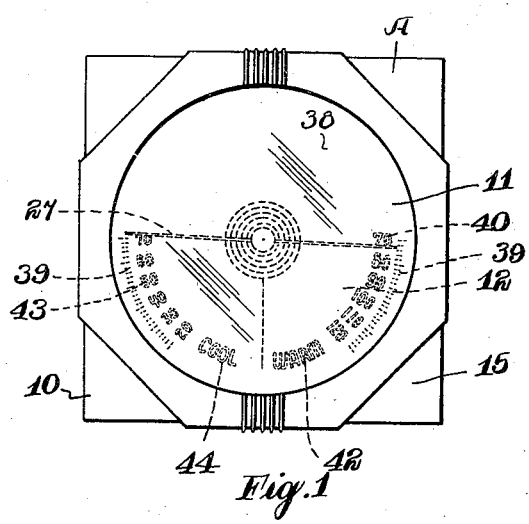
Figure 1 is a front elevation view of our thermometer.

Our thermometer A comprises a decorous outer casing 10 having a glass face 11 thereon. The face 11 covers a dial 12 which is readily visible beneath the glass face 11.

The dial 12 is substantially circular in shape and is provided with an annular cylindrical flange 13 thereupon to space the dial 12 from the glass face 11. Extending from the cylindrical flange 13 is a short bearing flange 14 parallel the face of the dial 12 and adapted to engage the glass face 11. Extending radially from the flange 13 we provide a series of angularly spaced ears 14'.

The outer casing 10 is provided with a front face 15 and side walls 16 of sufficient width to include the thermometer mechanism. A circular flange 17 extending rearwardly from the rear surface 18 of the front face 15 of the casing 10 incloses the edges of the glass face 11 and holds this face in place. Pairs of spaced flanges 19 adjoin the flange 17 and provide a locking means for the ears 14' of the dial 12. The ears 14' extend between the flanges 19, preventing relative rotation between the casing 10 and the dial 12.

A bracket plate 20 having an upstanding flange 22 thereon is secured to the rear face of the dial 12 by means of a collar 23 having a hollow shank 24 thereon which extends through the dial 12 and through a collar 25 on the front side of the dial and is riveted over the collar 25 to hold the bracket 20 securely to the dial 12. Through the hollow shank 24 and freely movable therein with virtually no friction, we provide a spindle 26 upon which the pointer 27 is mounted by friction. The spindle 26 on the rear side of the dial 12 is provided with a portion 28 of enlarged diameter having a transverse slot 29 in the end thereof. A coil 30 of bimetallic thermostatic material is secured at one end in the slot 29. The other end 32 of the coil 30 extends through the upstanding flange 22 on the bracket 20.

The bracket 20 is held with some friction against the rear surface of the dial 12 but may be pivoted radially about the shank 24 when necessary. Such shifting acts to adjust the thermometer and in this way the pointer 27 may be made to indicate correctly.

The back covering plate 33 is secured by screws 34 to spacing posts 35 extending rearwardly from the front face 15 of the casing 10. This rear face 33 is perforated at 35 so that air surrounding the thermometer may pass freely into and out of a thermometer casing into contact with the thermostatic coil 30. Inwardly extending legs 36 cut from the material forming the back covering plate 33 extend inwardly into engagement with the ears 14' on the dial 12, thus holding this dial in proper position at all times when the back cover plate is in place.

Figure 6:
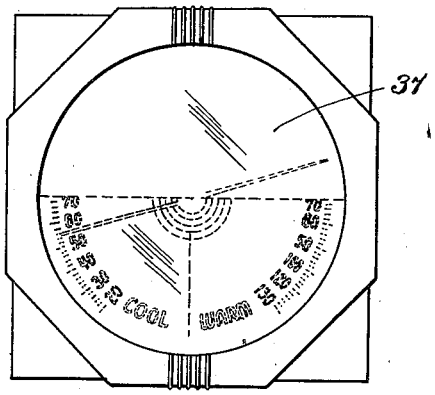
Figure 6 is a front elevation view of a slightly different form of construction.
Figure 2:
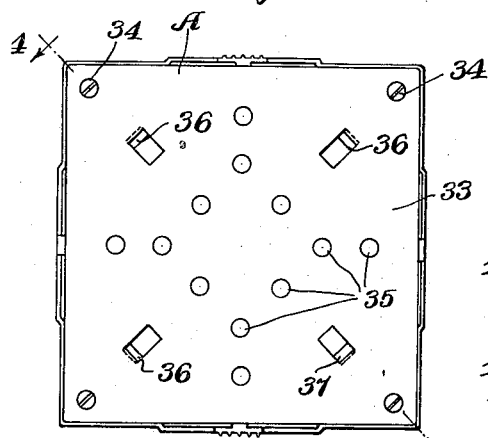
Figure 2 is a rear elevation view of the same.
Figure 3:
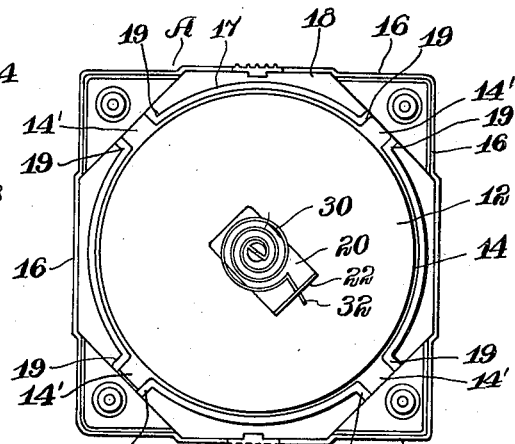
Figure 3 is a rear elevation view of the thermometer with the back inclosing plate removed therefrom.
Figure 4:
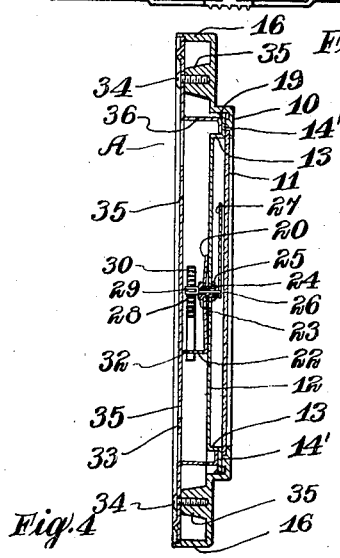
Figure 4 is a sectional view on the line 4—4 of Figure 2.
Figure 5:
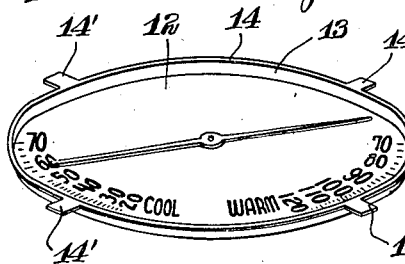
Figure 5 is a perspective view of the indicating dial of the thermometer.

In Figure 6 we have disclosed a slightly modified form of construction in which the dial 12 is provided with a covering sheet 37 which covers the upper portion of the dial 12 and is spaced sufficiently therefrom to also cover one end of the pointer 27. The cover plate 37 forms a space upon which advertising may be placed if desired.

It should be noted that the upper portion of the dial 12 is not provided with designating numerals and may be provided with advertising indicia 38, noted in Figure 1 of the drawing. This indicia is of particular importance for whenever the pointer 27 designates a point which is somewhat distinct from the predetermined temperature shown at the start of both of the scales, the pointer 27 will point to this indicia.

The scales are shown on the dial 12 extending along oppositely disposed arcuated paths. In the construction shown the numerals "70" are diametrically opposite. By decreasing the angularity between the opposite ends of the pointer 27 to less than 180 degrees, however, these numerals would not have to be directly opposite to be simultaneously pointed out by the pointer 27. At any temperature other than 70 degrees, however, it will be noted that only one end of the pointer 27 will read upon one of the scales 39. As one of the scales 39 has adjacent indicia 40 calibrating the scale from 70 to 120 degrees, this scale 39 is also provided with an indicia 42 designating "Warm". As the other scale 39 has indicia 43 reading from 70 to 20 degrees, this scale is designated "Cool" in the indicia 44. One scale 39 with its adjacent indicia 40, 42, may be colored in one color, while the other scale and its adjacent indicia 43, 44, may be colored in a different color to thoroughly differentiate between these two scales.

In accordance with the patent statutes we have described the principles of operation of my thermometer and while we have endeavored to set forth the best embodiments thereof, we desire to have it understood that this is only a means of carrying out our invention and that obvious changes may be made within the scope of the following claims without departing from the spirit of our invention.

We claim:

1. A thermometer including a display panel, a thermostatic element secured adjacent said display panel, a double ended pointer secured to said thermostatic element to be operated thereby over said display panel, a pair of spaced scales arranged on adjacent quadrants of said panel, one scale of which is co-operable with one end of said pointer to register temperatures above a predetermined degree, the other scale of which is co-operable with the other end of said pointer to register temperatures below a certain predetermined degree, and means for concealing one end of said pointer while the other end thereof is registering a temperature above or below said predetermined temperature.

2. A thermometer including a thermostatic element operable by the changes in temperature, a balanced temperature indicating needle means, a dial over which said needle moves, and indicia arranged in two spaced scales on adjacent quadrants of said dial each scale cooperable with one end of said needle for indicating the temperature associated with said needle means, only one end of said indicating needle cooperating with a scale at a time.

3. A thermometer comprising a thermostatic element operable by the changes in temperature, a balanced indicating pointer operable by said thermostatic element, a separate visible scale cooperable with each end of said pointer, and means for concealing one end of said pointer while the other end is indicating a temperature.

ROBERT E. GORDONIER.
HOWARD L. FISCHER.